United States Patent
Malhotra et al.

(10) Patent No.: US 11,977,593 B2
(45) Date of Patent: May 7, 2024

(54) LOCATION-BASED SEARCH RESULTS

(71) Applicant: Apple Inc., Cupertino, CA (US)

(72) Inventors: Anubhav Malhotra, Sunnyvale, CA (US); John M. Hornkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/348,698

(22) Filed: Jun. 15, 2021

(65) Prior Publication Data

US 2021/0312004 A1  Oct. 7, 2021

Related U.S. Application Data

(62) Division of application No. 15/851,660, filed on Dec. 21, 2017, now Pat. No. 11,061,983.

(60) Provisional application No. 62/574,702, filed on Oct. 19, 2017.

(51) Int. Cl.
| | |
|---|---|
| *G06F 16/9537* | (2019.01) |
| *G06F 16/248* | (2019.01) |
| *G06F 16/9032* | (2019.01) |
| *H04L 9/40* | (2022.01) |
| *H04W 4/02* | (2018.01) |
| *H04W 12/08* | (2021.01) |

(52) U.S. Cl.
CPC ........ *G06F 16/9537* (2019.01); *G06F 16/248* (2019.01); *G06F 16/90328* (2019.01); *H04L 63/102* (2013.01); *H04W 4/025* (2013.01); *H04W 12/08* (2013.01)

(58) Field of Classification Search
CPC . H04W 4/025; H04W 12/08; G06F 16/90328; G06F 16/9537; G06F 16/248; H04L 63/1021; H04L 63/102
See application file for complete search history.

(56) References Cited

U.S. PATENT DOCUMENTS

| | | |
|---|---|---|
| 9,294,873 B1 | 3/2016 | MacGregor |
| 9,619,202 B1 | 4/2017 | Weingartner |
| 9,628,950 B1 * | 4/2017 | Noeth .................. H04W 4/021 |
| 9,659,321 B2 | 5/2017 | Torres et al. |
| 9,734,134 B1 * | 8/2017 | Boynes ............... G06F 16/9574 |
| 2005/0232131 A1 | 10/2005 | Bulleit et al. |
| 2007/0036514 A1 | 2/2007 | Takai |
| 2013/0325612 A1 | 12/2013 | Sommerville et al. |
| 2014/0379467 A1 | 12/2014 | Huang |
| 2015/0095128 A1 | 4/2015 | Mehra et al. |

(Continued)

*Primary Examiner* — Kuen S Lu

(74) *Attorney, Agent, or Firm* — BAKERHOSTETLER

(57) ABSTRACT

A device implementing a system for providing location based search results includes at least one processor configured to detect that a location of a device is within a location of a store or within a threshold distance of the location, and establish a connection with a wireless network of the store. The at least one processor is configured to access an intranet associated with the store, the intranet being accessed via a network identifier previously stored on the device in association with the store, and receive user input for a search. The at least one processor is configured to obtain, via the intranet, at least one of a query completion suggestion or search result having been targeted to the location of the store or the threshold distance of the location, and display the at least one of the query completion suggestion or the search result in association with the search.

21 Claims, 8 Drawing Sheets

(56) References Cited

U.S. PATENT DOCUMENTS

| | | |
|---|---|---|
| 2017/0041744 A1 | 2/2017 | McKay |
| 2017/0289168 A1* | 10/2017 | Bar ...................... H04L 63/102 |
| 2017/0345085 A1 | 11/2017 | Hwang |
| 2018/0046824 A1 | 2/2018 | Rajadurai |
| 2018/0159960 A1* | 6/2018 | Farrugia ............. H04L 61/4511 |
| 2019/0065504 A1* | 2/2019 | Zaheer ............... G06Q 30/0639 |

* cited by examiner

LOCATION-BASED SEARCH RESULTS

CROSS-REFERENCE TO RELATED APPLICATIONS

The present application is a divisional of U.S. patent application Ser. No. 15/851,660, entitled "LOCATION-BASED SEARCH RESULTS," filed Dec. 21, 2017, which claims the benefit of U.S. Provisional Patent Application Ser. No. 62/574,702, entitled "LOCATION-BASED SEARCH RESULTS," filed Oct. 19, 2017, each of which is hereby incorporated herein by reference in its entirety and made part of the present U.S. Utility Patent Application for all purposes.

TECHNICAL FIELD

The present description generally relates to providing query completion suggestions and/or search results, including providing query completion suggestions and/or search results based on device location.

BACKGROUND

Electronic devices such as laptops, mobile phones, computers and mobile media devices can run applications for performing searches. A user can input a search term within such an application on the electronic device, and the application can perform a local search on the electronic device for the search term and/or request a server to perform a search on the search term. The application may then provide one or more search results that are retrieved based on the search term.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides query completion suggestions and/or search results to a device of a user based on a location of the device. For example, when a user is within a store or within a threshold distance of the store, search results and/or query completion suggestions specific to that store may be of particular interest to the user. However, in order to ensure user/device privacy and anonymity, it may not be desirable to transmit identifying information, such as the location of the device, to a remote server (e.g., a third party and/or untrusted server), or storing such information on a remote server.

In the subject system, when a user initiates a search on a device, such as by inputting at least a partial query, the device may determine that its location is within a store location or within a threshold distance of the store location. Based on the determination that the device is located within the store location, or within the threshold distance of the store location, the device may provide the user with query completion suggestion(s) and/or search results targeted to the store location without transmitting device identifying information, user identifying information, and/or the query information to a remote server. Rather, the query completion suggestion(s) and/or search results may be obtained based on one or more of: information received via an intranet of the store, keywords, search terms, and/or search results that are targeted to, and/or associated with the store, and are pre-stored locally on the device, store information provided by a trusted intermediary server, and/or store information provided by pre-authorized remote servers.

Thus, the subject system allows a user to receive query completion suggestions and/or search results relevant to (and/or targeted to) their particular location, such as within a store, without requiring the user to provide user identifying information and/or device identifying information to a remote server, such as a third party server. In this manner, the subject system preserves the privacy of the user while still providing the user with information relevant to their location.

Figure 1:
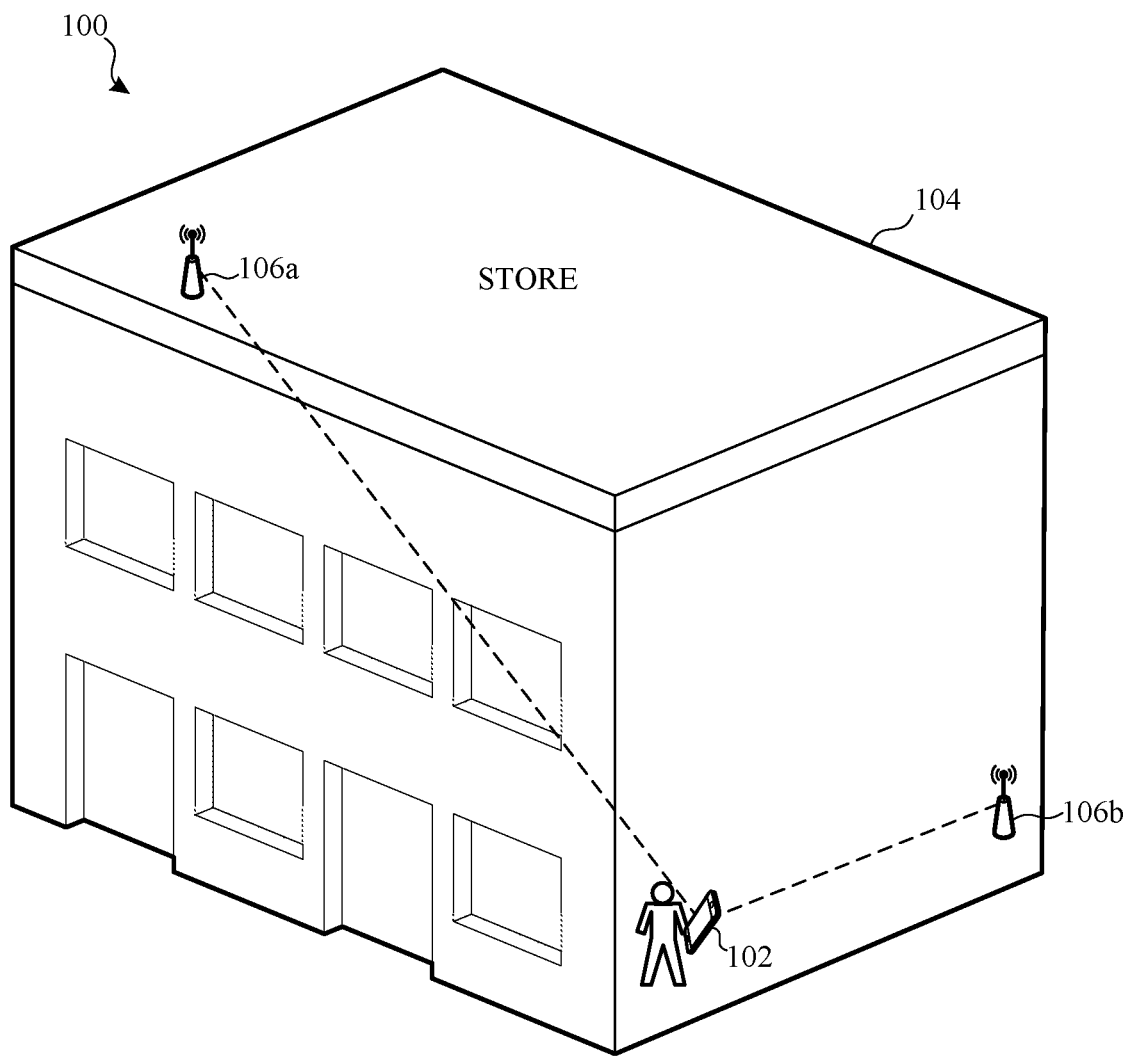
FIG. 1 illustrates an example environment in which an electronic device may implement the subject system in accordance with one or more implementations.

FIG. 1 illustrates an example environment 100 in which an electronic device may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an electronic device 102, a store 104, and wireless access points 106a-106b (e.g., Wi-Fi access points, cellular access points, and the like). For explanatory purposes, the environment 100 is illustrated in FIG. 1 as including a single electronic device 102, a single store 104, and two wireless access points 106a-106b; however, the environment 100 may include any number of electronic devices, any number of stores, and any number of wireless access points.

The environment 100 allows for the electronic device 102 to determine its location based on one or more positioning technologies. Examples of such positioning technologies include, but are not limited to, Global Navigation Satellite System (GNSS), wireless access point technology (e.g., based on time of arrival, angle of arrival, and/or signal strength of signals received from wireless access points at known locations such as 106a-106b), cellular phone signal positioning, Bluetooth signal positioning and/or image recognition positioning. Moreover, the electronic device 102 may implement an inertial navigation system (INS) which uses device sensor(s) (e.g., motion sensors such as accelerometers, gyroscope) to calculate device state (e.g., position, orientation and velocity) for supplementing location data provided by the above-mentioned positioning technologies.

The environment 100 may facilitate providing search results and/or query completion suggestions to the electronic device 102, based on a determination that the location of the electronic device 102 is within the store 104 or within a threshold distance of the store 104. Examples of the store 104 include, but are not limited to, a retail store, a dine-in restaurant, a drive-through restaurant, a showroom, a kiosk, a gas station, a museum, an amusement park, a public park, a tourist landmark, an indoor shopping mall, an outdoor shopping mall, a sports venue, a music venue, or any identifiable location, such as any location that can be geo-fenced.

In the example of FIG. 1, the user of the electronic device 102 is traveling by foot and is located within the store 104. However, the user may be traveling, for example, by a vehicle (e.g., an automobile, a motorcycle, a bicycle) that is located within a threshold distance of the store 104. For example, if the store 104 is a drive-through restaurant, the user may be traveling by automobile in the drive-through lane, which is at a predetermined position and distance with respect to the physical restaurant.

In addition to contributing to the position solution of the electronic device 102, the wireless access points 106a-106b may also be used to connect the electronic device 102 to a network, such as a local area network, a private network (e.g., an intranet), and/or a public network (e.g., the Internet). For example, one or more of the wireless access points 106a-106b may connect the electronic device 102 to an intranet associated with the store 104, as discussed further below with respect to FIG. 2. Alternatively or in addition, one or more of the wireless access points 106a-106b may connect the electronic device 102 to the Internet.

Figure 2:
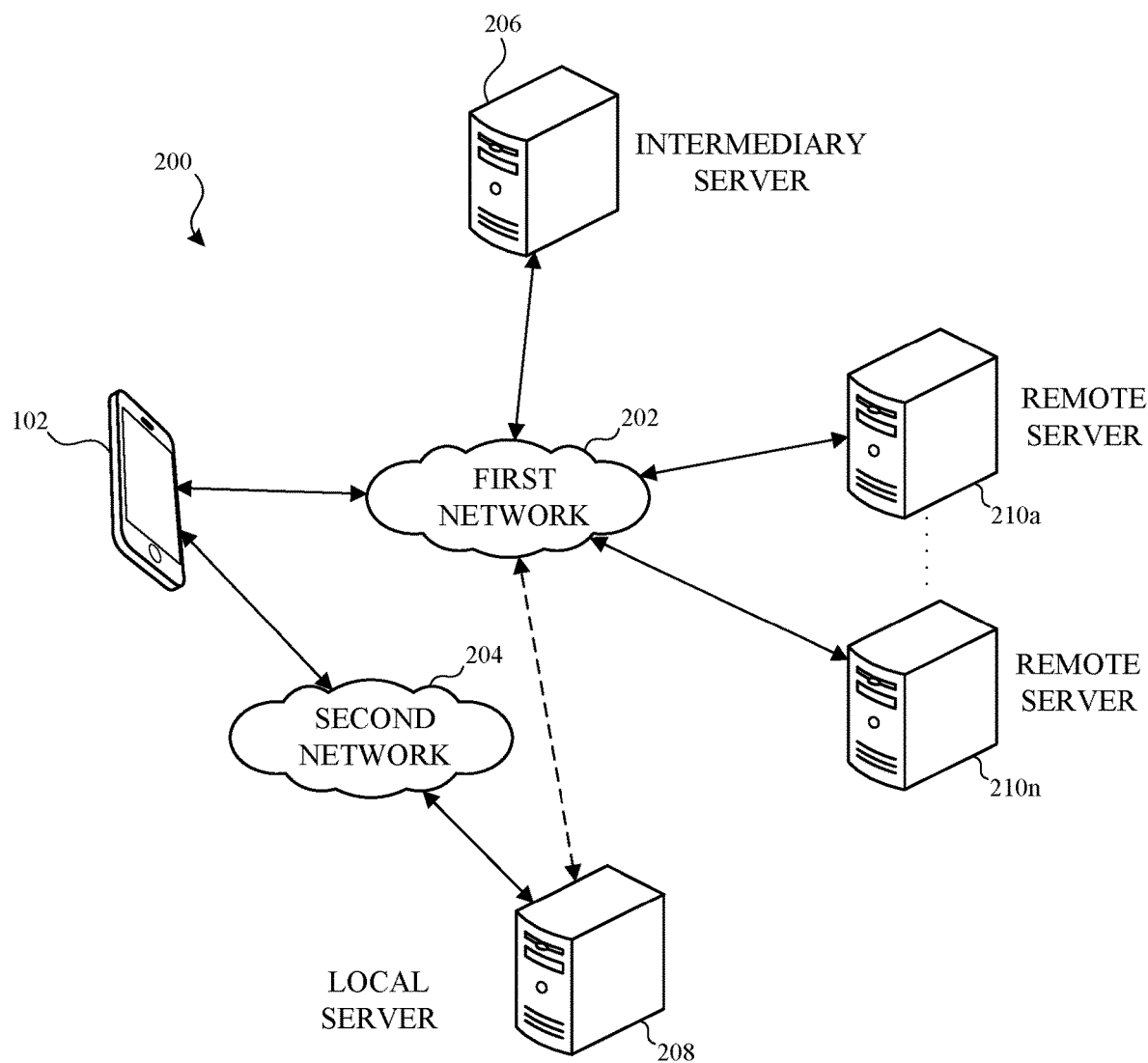
FIG. 2 illustrates an example network environment for performing a search based on device location in accordance with one or more implementations.

FIG. 2 illustrates an example network environment 200 for performing a search based on device location in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 200 includes the electronic device 102, a first network 202, a second network 204, an intermediary server 206, a local server 208, and one or more remote servers 210a-210n. In one or more implementations, the first network 202 may communicatively (directly or indirectly) couple, for example, any two or more of the electronic device 102, the intermediary server 206, the remote servers 210a-210n, and the local server 208. The first network 202 may be an interconnected network of devices that may include, or may be communicatively coupled to, the Internet.

In one or more implementations, the second network 204 may communicatively (directly or indirectly) couple, for example, the electronic device 102 and the local server 208. In one or more implementations, the second network 204 may be an intranet which corresponds to a private network associated with a store (e.g., the store 104). The electronic device 102 may obtain access to this intranet via one of the wireless access points 106a-106b.

For explanatory purposes, the network environment 200 is illustrated in FIG. 2 as including the electronic device 102, the intermediary server 206, the remote servers 210a-210n, the local server 208, and the first and second networks 202 and 204; however, the network environment 200 may include any number of electronic devices, any number of servers, and any number of networks. In one or more implementations, the local server 208 may be located within a location of an associated store or may be located remotely from an associated store (but accessible via an intranet of the associated store).

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIGS. 1-2, by way of example, the electronic device 102 is depicted as a smartphone. The electronic device 102 may be, and/or may include all or part of, the electronic device discussed below with respect to FIG. 3, and/or the electronic system discussed below with respect to FIG. 8.

One or more of the intermediary server 206, the remote servers 210a-210n, and/or the local server 208 may be, and/or may include all or part of the electronic system discussed below with respect to FIG. 8. One or more of the intermediary server 206, the remote servers 210a-210n, and/or the local server 208 may include one or more servers, such as a cloud of servers, that may be used in a system for performing a search based on device location.

For example, the electronic device 102 may detect that its location is within, or within a threshold distance of, the store 104. The electronic device 102 may further receive user input to initiate a search, e.g., the user may input a partial query. In response, the electronic device 102 may obtain query completion suggestion(s) and/or search result(s) that are targeted to and/or associated with the location of the store 104. These query completion suggestion(s) and/or search result(s) may be obtained from one or more of: the local server 208 (e.g., as discussed below with respect to FIG. 4), locally on the electronic device 102 (e.g., as discussed below with respect to FIG. 5), the intermediary server 206 (e.g., as discussed below with respect to FIG. 6), and/or pre-authorized remote server(s), for example, one or more of remote servers 210a-210n pre-authorized by the user (e.g., as discussed below with respect to FIG. 7). Thus, the subject system allows the user to receive query completion suggestions and/or search results associated with, and/or targeted to, the location of the store 104 without requiring the user to provide identifying information, such as the location of the device, to third party and/or unauthorized servers.

Figure 3:
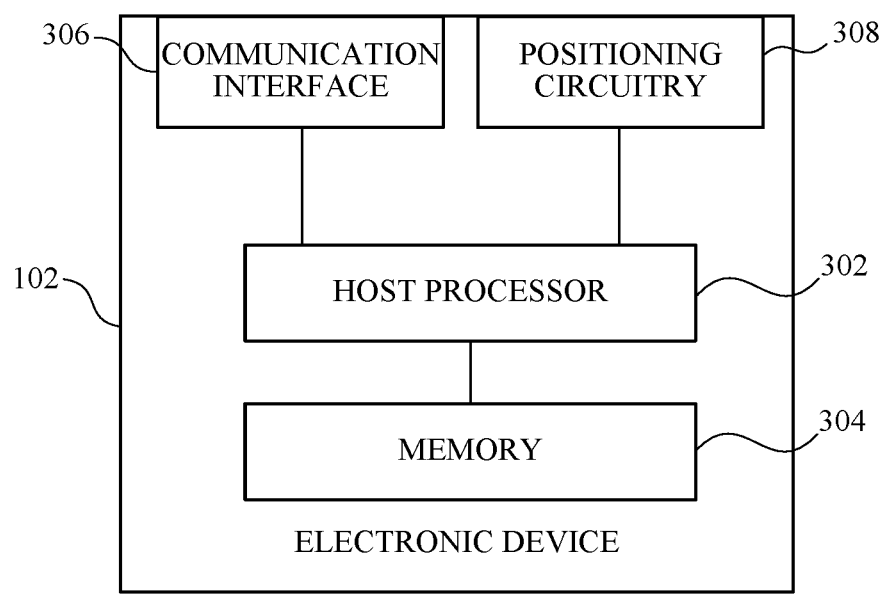
FIG. 3 illustrates an example electronic device that may implement the subject system in accordance with one or more implementations.

FIG. 3 illustrates an example electronic device 102 that may implement the subject system in accordance with one or more implementations. For example, the electronic device 102 can correspond to the electronic device from FIGS. 1-2. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 302, a memory 304, a communication interface 306 and the positioning circuitry 308. The host processor 302 may include suitable logic, circuitry, and/or code that enable processing data and/or controlling operations of the electronic device 102. In this regard, the host processor 302 may be enabled to provide control signals to various other components of the electronic device 102. The host processor 302 may also control transfers of data between various portions of the electronic device 102. Additionally, the host processor 302 may implement an operating system or may otherwise execute code to manage operations of the electronic device 102.

The memory 304 may include suitable logic, circuitry, and/or code that enable storage of various types of information such as received data, generated data, code, and/or configuration information. The memory 304 may include, for example, random access memory (RAM), read-only memory (ROM), flash, and/or magnetic storage. In one or more implementations, the memory 304 may store code corresponding to one or more applications or apps, hereinafter "store applications," that are respectively associated with one or more stores (e.g., the store 104). In one or more implementations, the store applications may provide information for obtaining query completion suggestion(s) and/or search result(s), such as when the user is within a threshold distance of a physical store associated with a given application. The memory 304 may further store predefined data that may be separate from and/or associated with the store applications. For example such predefined data may be one or more of store location data, network identifiers (e.g., uniform resource locators ("URLs")), search keywords, and/or search content.

The positioning circuitry 308 may be used in determining the location of the electronic device 102 based on positioning technology. For example, the positioning circuitry 308 may provide for one or more of GNSS positioning (e.g., via a GNSS receiver), wireless access point positioning (e.g., via a wireless network receiver), cellular phone signal positioning, Bluetooth signal positioning (e.g., via a Bluetooth receiver), image recognition positioning (e.g., via an image sensor), and or an INS (e.g., via motion sensors such as an accelerometer and/or gyroscope).

The communication interface 306 may include suitable logic, circuitry, and/or code that enables wired or wireless communication, such as between any of the electronic device 102, the intermediary server 206, the remote servers 210a-210n and/or the local server 208, over the first network 202 and/or the second network 204. The communication interface 306 may include, for example, one or more of a Bluetooth communication interface, an NFC interface, a Zigbee communication interface, a WLAN communication interface, a USB communication interface, or generally any communication interface. The communication interface 306 may be used to transmit information to the intermediary server 206, the remote servers 210a-210n, and/or the local server 208, and to receive information corresponding to query completion suggestion(s) and/or search result(s) from the intermediary server 206, the remote servers 210a-210n, and the local server 208.

In one or more implementations, one or more of the host processor 302, the memory 304, the communication interface 306, the positioning circuitry 308, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 4:
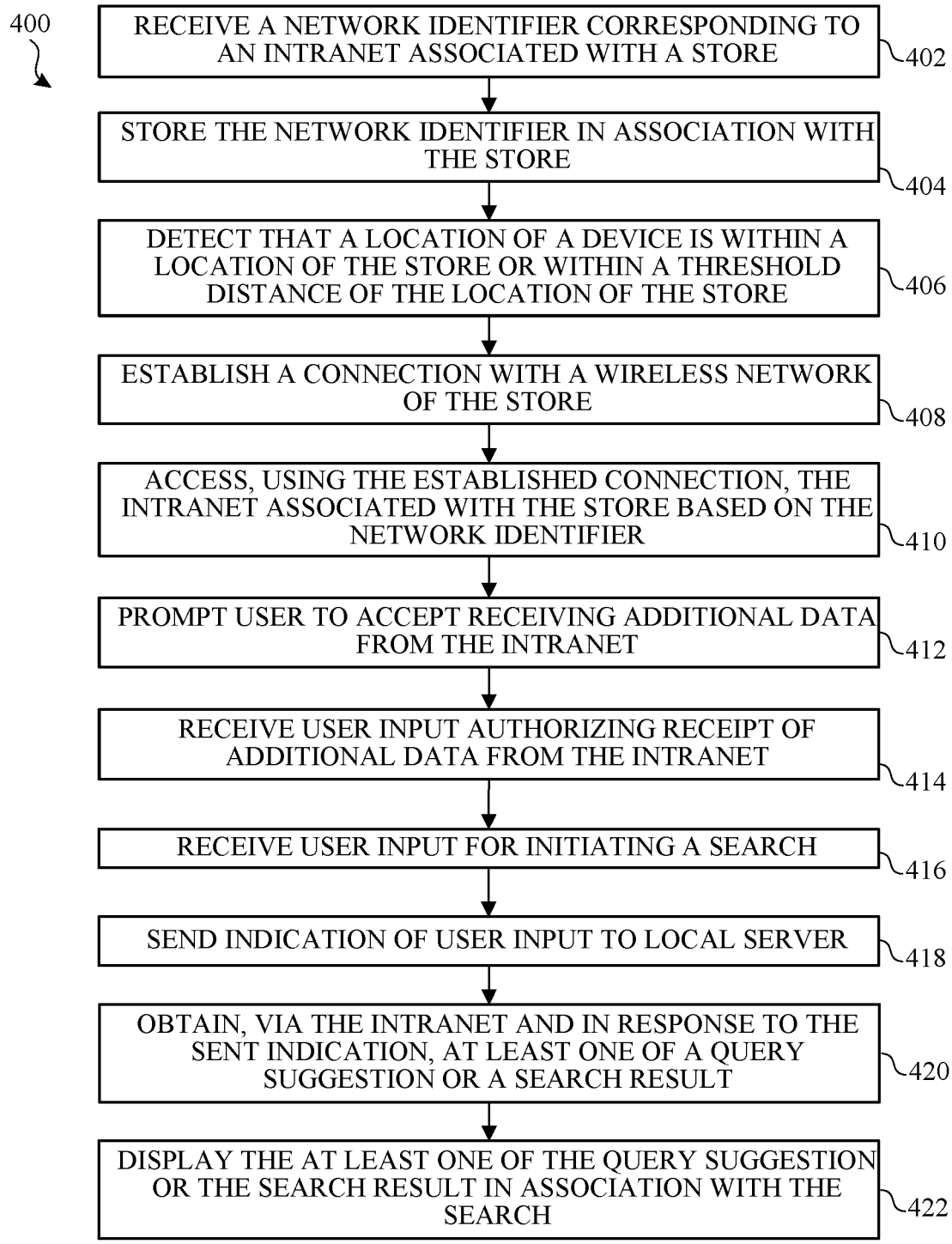
FIG. 4 illustrates a flow diagram of an example process for performing a search based on device location in accordance with one or more implementations.

FIG. 4 illustrates a flow diagram of an example process for performing a search based on device location in accordance with one or more implementations. For explanatory purposes, the process 400 is primarily described herein with reference to the electronic device 102 of FIGS. 1-3. However, the process 400 is not limited to the electronic device 102, and one or more blocks (or operations) of the process 400 may be performed by one or more other components of the electronic device 102. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

In one or more implementations, the electronic device 102 may have installed one or more store applications respectively corresponding to one or more stores (e.g., a chain of retail stores). For example, the electronic device 102 may install a store application "Store A App" corresponding to retail store chain A (e.g., one or more stores), and/or may further install a store application "Store B App" corresponding to a different (e.g., competing) retail store chain B (e.g., one or more stores).

At the time of installing a particular store application and/or any time thereafter, the store application may provide a set of network identifiers (e.g., URLs) to the electronic device 102 for storing in the memory 304. The set of network identifiers may include one or more network identifiers corresponding to a local server 208 associated with the particular store (and/or store chain) which can be accessed via an intranet (e.g., the second network 204) associated with the particular store (and/or store chain). In one or more implementations, each network identifier within the set of network identifiers may correspond to a different individual store location of a particular retail chain. For example, Store A App may provide the electronic device 102 with a set of network identifiers, each respectively corresponding to a different individual store location for retail store chain A. Thus, in FIG. 4, the electronic device 102 receives a network identifier (e.g., URL) corresponding to an intranet associated with a store (402), and the electronic device 102 stores the network identifier in association with the store (404).

Each network identifier may be used to retrieve data (e.g., product availability, inventory, promotions and/or coupons) specific to its respective individual store location. For example, store A in San Francisco store may have different product availability, inventory, promotions and/or coupons than store A in New York, and the local servers (e.g., the local server 208) at each of the San Francisco and New York would have respective network identifiers (e.g., URLs) for accessing data specific to that store location. As is discussed further below, the retrieved data may be used to provide query completion suggestions and/or search results specific to an individual store location.

In one or more implementations, the electronic device 102 stores the network identifier(s) in association with its system-wide search functionality. For example, the system-wide search may be implemented by the operating system of the electronic device 102. The system-wide search may correspond to a search system which searches a local index of all items and files on the electronic device 102. The system-wide search may allow the user to search for and locate a wide variety of items on the electronic device 102 (e.g., locally-stored items), including documents, pictures, music, applications, and system preferences. In addition, specific words in locally stored documents, in webpages in a web browser's history, in locally stored emails, and the like can be searched. Moreover, using the subject system, information obtained from an individual store's intranet may be used to provide search suggestions (e.g., search results and/or query completion suggestions) when the user initiates a system-wide search within the store or within a threshold distance of the store.

The electronic device 102 may detect that its location is within the store or within the threshold distance of the store (406). In this regard, individual store locations for retail store chain A or B may be geo-fenced, such that a virtual perimeter, or "geo-fence," is defined for individual store locations. Geo-fences may be defined, for example, by a set of coordinates that define a virtual perimeter around a location. The set of coordinates may be provided, for example, by the application associated with the store.

The positioning circuitry 308 of the electronic device 102 may be used in conjunction with the geo-fenced store locations to determine when the electronic device 102 is located within the store or within the threshold distance of the store (e.g., within 5 feet of the store, or within the drive-thru lane of a restaurant). The store application may determine (e.g. based on program/administrator settings) which of being within the store or within the threshold distance should qualify as a "predesignated area" to trigger location-based searching (e.g., for supplemental search suggestions). Moreover, in addition to the current device position, the electronic device's direction of travel and/or velocity may be determined by the positioning circuitry 308. The electronic device's direction and/or velocity may be used to determine that the electronic device 102 is about to enter or exit the predesignated area, and search suggestions (e.g., query completion suggestions and/or search results) can be enabled or disabled accordingly.

In response to detecting that the location of the electronic device 102 is within the predesignated area, the electronic device 102 may establish a connection with a wireless network of the individual store (408). For example, the connection to the wireless network may be made via one or more of wireless access points 106a-106b. In one or more implementations, the electronic device 102 may prompt the user to confirm whether they would like to connect to the wireless network of the individual store. In one or more implementations, the electronic device 102 may determine that it is within the predesignated area when a beacon signal or other pre-association signal is received from a wireless access point associated with the store. For example, the beacon signal may include an identifier, such as a medium access control (MAC) address, that is pre-stored on the electronic device 102 as being associated with the store, such as when the application associated with the store is installed.

Using the established connection, the electronic device 102 may access the intranet associated with the store (e.g., associated with the retail chain), based on the respective network identifier (e.g., URL) stored in the memory 304 (410). Since the network identifier was previously stored in memory, it may not be necessary for the store application to be running on the electronic device 102 in order for the electronic device 102 to access the intranet for the store.

In one or more implementations, the electronic device 102 may prompt the user to connect to the intranet associated with the store and/or to receive additional data from the intranet associated with the store (412). If the user declines, the electronic device 102 would not connect to the intranet via the network identifier (e.g., URL). If the user accepts (414), the electronic device 102 would connect to the intranet via the network identifier (e.g., corresponding to the local server 208), so that data specific to the individual store (e.g., San Francisco location of store A) can be accessed for supplemental search results and/or query completion suggestions. As discussed above, the local server 208 is referred to as being "local" in the sense that the local server 208 may only be accessible by the electronic device 102 via the intranet associated with the store. However, the local server 208 may not be physically located locally, e.g., within the store.

In establishing a connection to the intranet, the electronic device 102 may implement media access control (MAC) address randomization, so as to change the factory-assigned MAC of the electronic device 102. In this manner, the retail chain's local server (e.g., the local server 208) would not receive identifying information of the electronic device 102. Further, the MAC address may be randomized every time the electronic device 102 connects to an individual store's intranet, so that neither the individual store nor the retail store chain could link a current identifier to a previous identifier for the electronic device 102. In this manner, anonymity can be preserved when the user performs a search.

In a case where the store application is running on the electronic device 102 while the electronic device 102 is within the predesignated area of the store, the subject system may implement further measures to maintain user privacy and anonymity. For example, the store application (e.g., Store A App) may have a user-selectable setting which permits the store application to access device location. If the user does not permit device location access, the electronic device 102 may not provide the device location to Store A App. Thus, the local server 208 corresponding to San Francisco store A would be permitted to send data to the electronic device 102; however, the location of the electronic device 102 would be prevented from being sent to the local server 208 and/or the remote server 210a corresponding to retail store chain A.

The electronic device 102 may receive user input, such as at least a partial query, for initiating a search (416), for example, a system-wide search. As noted above, the system-wide search may provide for surfacing documents, emails, in-app content, pictures, music, applications, system preferences, specific words in documents and in webpages in a web browser's history, bookmarks, and the like. In the subject system, the system-wide search results may further include search suggestions (e.g., search results and/or query completion suggestions) based on data retrieved from the intranet corresponding to the individual store. As noted above, this data may include product availability, inventory, promotions and/or coupons specific to that store.

The electronic device 102 sends an indication of the user input to the local server 208 via the intranet (418). The electronic device 102 obtains, via the intranet and in response to the sent indication, at least one of a query completion suggestion or a search result based on the intranet data (420). In one or more implementations, the electronic device 102 may not provide an indication of the user input to the local server 208 and instead may utilize the data associated with the store that was retrieved via the intranet to provide query completion suggestion(s) and/or search result(s), e.g., without providing the user input to the local server 208.

The query completion suggestion(s) and/or search result(s) obtained from the intranet may adjust based on the indication of the user input sent to the local server 208. For example, the user may initially perform a gesture to open up the system-wide search interface (e.g., a swipe gesture on the touchscreen of the electronic device 102). At that time, the query completion suggestion(s) and/or search result(s) provided via the intranet may correspond to search suggestions that are predefined (e.g., "items on sale," "special deals," "today's coupons"). If the user begins to type within a search field, the search suggestions may be dynamically updated based on the current input within the search field. Thus, as the user continues to type a term, different query completion suggestions and/or search results may be obtained, such as from the intranet.

In addition to text-based input, the user may enter search queries via the electronic device 102 based on one or more of: voice input, barcode or quick response (QR) code scanning, object image recognition, and the like. Again, query completion suggestions and/or search results may be dynamically updated accordingly.

In one or more implementations, the intranet data provided via the network identifier (e.g. URL) may not be provided in response to the user initiating the search. Rather, the intranet data specific to an individual store may be provided, it its entirety, at or within a threshold time after the electronic device 102 connects to the intranet. The electronic device 102 may store this data (e.g., in cache) and the storage of such data may be temporary (e.g., based on time-to-live value predefined by the store application). Thus, when the user initiates a search within the store, the data specific to that store is already pre-fetched from the intranet and locally stored, so that the information can be obtained locally on the electronic device 102 without having to again access the intranet and/or without having to provide the partial query input by the user over the intranet.

The at least one of the query completion suggestion or the search result may be displayed in association with the search (422). In displaying the search results, the electronic device 102 may categorize the search results so that they are grouped according to the source from which they came. For example, typical search queries/results of bookmarks may be grouped under a "web browser" heading, emails may be grouped under an "email" heading, and photos may be grouped under a "photos" heading. Moreover, search queries/results from individual store A's intranet may be grouped under a "store A" heading. In one or more implementations, other display configurations can be used to categorize search queries/results.

In a case where the user selects one of the query completion suggestion(s) and/or search result(s) as provided via the intranet, the user may be directed to a page (e.g., an intranet webpage, an internet webpage, or a page (or user interface) within the respective store application) with more information for the selected item. For example, the webpage may be a profile page for the item, where the user can check product availability, customer reviews, promotions, prices, and options for purchasing the item. While the user may be provided access to a specific page of the store, only the local server 208 may have been made aware of the location of the electronic device 102 and/or the location of the electronic device 102 may have been obfuscated from the local server 208 (such as by MAC address randomization). In one or more implementations, the remote server 210a (e.g., corresponding to retail store chain A) is not provided with identifying information or query information that assisted the user to that page.

In one or more implementations, user interaction with respect to an item may result in the associated store paying a commission for the user interaction, such as to an entity associated with presenting the item to the user. The user interaction may correspond to a desired, predefined action based on the item information presented to the user. Examples of the desired action may include physical actions by the user, including but not limited to, the user physically entering the store (e.g., as determined by device location), the user scanning a coupon (e.g., displayed on the electronic device 102) at a store register, the user purchasing the item at a store register using store credit, or the like. Alternatively, or in addition, examples of the desired action may include user interaction with the electronic device 102, including but not limited to, user selection of the query completion suggestion(s) and/or search result(s), online purchase of the item, online endorsement of the item, or the like. In one or more implementations, the commission to be paid by the store may be based on a predefined agreement between the store and a search service implementing the subject system.

Figure 5:
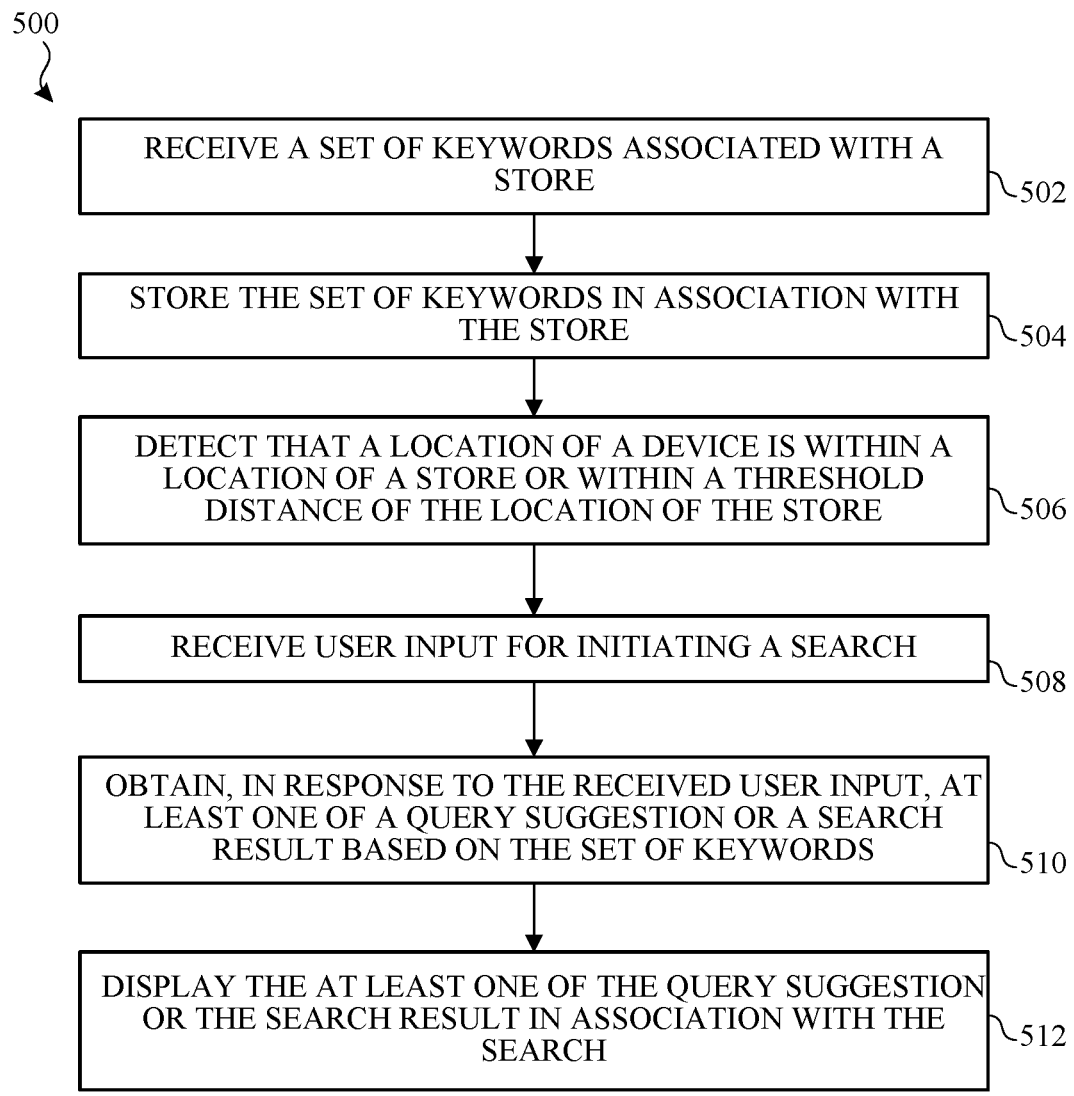
FIG. 5 illustrates a flow diagram of another example process for performing a search based on device location in accordance with one or more implementations.

FIG. 5 illustrates a flow diagram of another example process for performing a search based on device location in accordance with one or more implementations. For explanatory purposes, the process 500 is primarily described herein with reference to the electronic device 102 of FIGS. 1-3. However, the process 500 is not limited to the electronic device 102, and one or more blocks (or operations) of the process 500 may be performed by one or more other components of the electronic device 102. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As noted above with reference to FIG. 4, one or more store applications may be installed on the electronic device 102. For example, the electronic device 102 may install Store A App corresponding to retail store chain A, and/or Store B App corresponding to a competing retail store chain B. For example, retail store chain A and retail store chain B may be competitors.

At the time of installing and/or any time thereafter, each store application may provide a set of keywords associated with the respective store. For example, Store A App may provide the electronic device 102 with a set of keywords, each keyword respectively corresponding to possible search results or query completion suggestions related to retail store chain A. Examples of keywords include, but are not limited to, names of general categories of products or items (e.g., "shoes," "food"), specific names of products or items (e.g., "XYZ shoes," "ABC meat"), and/or generic terms related to store (e.g., "store hours," "what's new," "sale," "coupon"). Likewise, Store B App may provide the electronic device 102 with a different set of keywords, each keyword respectively corresponding to possible search results or query completion suggestions related to retail store chain B.

In one or more implementations, keywords may be associated with individual stores rather than with retail store chains, so that keywords are specific to an individual store. For example, at the time of installing Store A App, a set of keywords may be provided in association with San Francisco store A, such as products carried at San Francisco store A, and a different set of keywords may be provided in association with New York store A, such as products carried at New York store A. These sets keywords can be geo-fenced to their respective stores, so that they become available within search once the electronic device 102 is in the predesignated area for an individual store location.

Thus, in FIG. 5, the electronic device 102 receives information (e.g., a set of keywords) associated with a store (502), and the electronic device 102 stores this information (e.g., the set of keywords) in association with the store and/or in association with the physical location of the store (e.g., a set of coordinates) (504). In one or more implementations, the electronic device 102 associates this pre-stored information (e.g., the set of keywords) with its system-wide search functionality.

The electronic device 102 may detect that its location is within a location of the store or within a threshold distance of the location of the store (506). As discussed above with respect to FIG. 4, the electronic device 102 may make this detection based on geo-fencing of individual stores and detecting device location via the positioning circuitry 308.

The electronic device 102 may receive user input for initiating a search (508), for example, a system-wide search. Using the subject system, results for the system-wide search may be expanded to include search suggestions based on the keywords. As noted above, these keywords may include names of general categories of products or items, specific names of products or items, and/or generic terms related to store. The electronic device 102 may obtain, in response to the received user input, at least one of a query completion suggestion or a search result based on the set of keywords (510). These query completion suggestion(s) and/or search result(s) may supplement other search suggestions (e.g., as documents, pictures, music, applications, system preferences, specific words in documents and in webpages in a web browser's history, and/or bookmarks). In one or more implementations, the keyword-based query completion suggestion(s) and/or search result(s) may also be obtained in conjunction with the intranet-based suggestions described above with reference to FIG. 4.

As discussed above with reference to FIG. 4, the obtained query completion suggestion(s) and/or search result(s) may adaptively and/or dynamically adjust based on user input. Thus, search suggestions upon opening the system-wide search interface may be different than the dynamically-based search suggestions obtained as the user updates his/her search input (e.g., by typing, barcode or QR code scanning, object recognition).

By virtue of obtaining a set of keywords and locally storing the keywords a priori (e.g., when downloading the store application), it is possible for the user to receive search suggestions based on the keywords without having to connect to a network (e.g., an local intranet or the internet), and/or without having to open the store application. Rather, the system-wide search can simply fetch the keywords for the store when the electronic device 102 is detected to be within the predesignated area of the store. The device location need not be provided to any of the local server 208, the intermediary server 206, or the remote servers 210a-210n. In this manner, anonymity and user privacy may be preserved.

In one or more implementations, it is possible for a retail store chain (e.g., retail store chain B) to geo-fence its provided set of keywords to a competing retail store chain (e.g., retail store chain A). In this manner, the electronic device 102 may obtain search suggestions for retail store chain B while he/she is actually in the predesignated area of a store corresponding to retail chain store A. The predesignated area (e.g., within the store, within a threshold distance of the store) as defined by App B Store may be the same as, or may be different from, that as defined by App A Store. By permitting stores to geo-fence to competing stores, it is possible for more competitive pricing, products, sales, and the like to be presented to a user while the electronic device 102 is detected to be within a store.

The at least one of the query completion suggestion or the search result may be displayed in association with the search (512). In displaying the search results, the electronic device 102 may categorize the search results as described above. In a case where the intranet-based search suggestions from the process corresponding to FIG. 4 are also obtained, both the keyword-based suggestions and the intranet-based suggestions may be grouped under a similar heading (e.g., "store A" heading). In a case where competitive search results are obtained (e.g., from App B store), the set of keywords may be grouped under a separate heading (e.g., "store B" heading).

Moreover, the electronic device 102 may rank keywords based on predefined rules. For example, a store application may assign weights or otherwise prioritize certain keywords within its provided set of keywords. The electronic device 102 may access these weights or priorities in order to rank keywords for display. Furthermore, the electronic device 102 may itself prioritize keywords based on code stored in the memory 304. For example, in a case where sets of keywords are provided by both the Store A App and the Store B App, and the electronic device 102 is within store A, the electronic device 102 may prioritize the keywords provided by the Store A App over those provided by the Store B App. Based on the weights and/or priorities for keywords, the keywords are displayed in ranked order. In some cases, keywords below a threshold weight and/or priority may not be presented at all.

In a case where the user selects one of the query completion suggestion(s) and/or search result(s) corresponding to the keywords, the user may be directed to a page (e.g., an internet webpage, or a page (and/or user interface) within the respective store application) with more information for the selected item. Thus, the user may access a specific page of the store, but the store may not be made aware of the device location or query information that directed the user to the page. In one or more implementations, user interaction with respect to an item (e.g., a physical action such as entering the store or scanning a coupon, and/or user interaction with the device such as an online purchase or endorsement of the item) may result in the associated store being required to pay a commission for the user interaction, for example, based on a predefined agreement between the store and a search service implementing the subject system.

Figure 6:
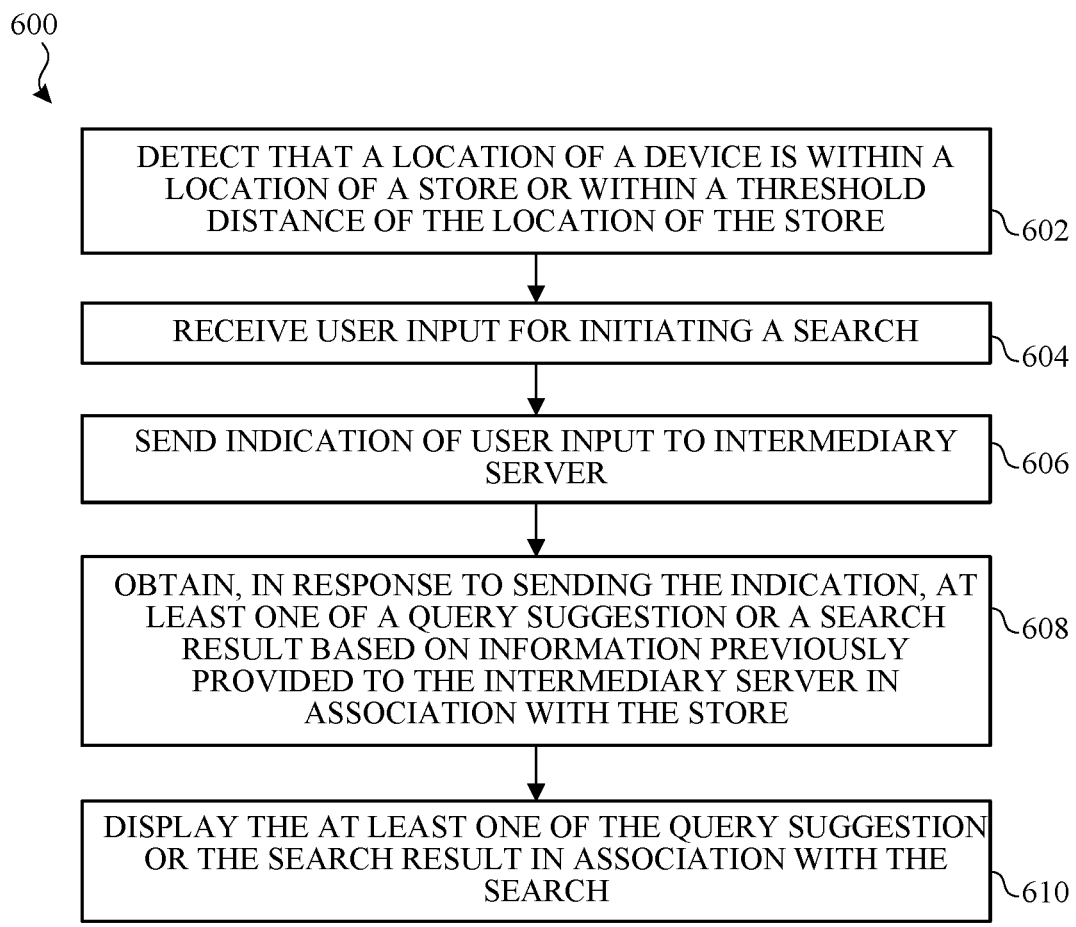
FIG. 6 illustrates a flow diagram of another example process for performing a search based on device location in accordance with one or more implementations.

FIG. 6 illustrates a flow diagram of another example process for performing a search based on device location in accordance with one or more implementations. For explanatory purposes, the process 600 is primarily described herein with reference to the electronic device 102 of FIGS. 1-3. However, the process 600 is not limited to the electronic device 102, and one or more blocks (or operations) of the process 600 may be performed by one or more other components of the electronic device 102. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

In the example of FIG. 6, it may not be not necessary for a store application (e.g. Store App A) to be installed on the electronic device 102. Rather, participating retail store chains (e.g., retail store chain A, retail store chain B) may provide respective retail store data to an intermediary server (e.g., the intermediary server 206) that is trusted by the electronic device 102.

In this regard, the intermediary server 206 may implement certain standards of user privacy. The electronic device 102 may present the user with these privacy terms and standards, and the user may agree to them. As such, the user may authorize the transfer of certain data between the electronic device 102 and the intermediary server 206, but not authorize that such data to be provided to the remote servers 210*a*-210*n*.

As such, store data corresponding to retail store chains A and B may be pre-stored on the intermediary server 206, and may be periodically updated on the intermediary server 206. This data can include, but is not limited to, store layout information for individual stores, product availability, inventory, promotions and/or coupons.

Thus, in FIG. 6, the electronic device 102 may detect that its location is within a location of the store or within a threshold distance of the location of the store (602). As discussed above, the electronic device 102 may make this detection based on geo-fencing of individual stores and detecting device location via the positioning circuitry 308.

The electronic device 102 may receive user input for initiating a search (604), for example, a system-wide search. Using the subject system, results for the system-wide search may be expanded to include query completion suggestion(s) and/or search result(s) derived from the retail store information previously stored on the intermediary server 206. These query completion suggestion(s) and/or search result(s) may supplement other search suggestions as described above. In one or more implementations, the intermediary server based query completion suggestion(s) and/or search result(s) may be obtained in conjunction with the search suggestions described above with reference to FIGS. 4-5.

Thus, the electronic device 102 sends an indication of the user input to the intermediary server 206 (606). The electronic device 102 obtains, in response to the sent indication, at least one of a query completion suggestion or a search result based on the information previously provided to the intermediary server in association with the store (608).

As discussed above with reference to FIG. 4, the obtained query completion suggestion(s) and/or search result(s) may adaptively and/or dynamically adjust based on user input. Thus, search suggestions upon opening the system-wide search interface may be different than the dynamically-based search suggestions obtained as the user updates his/her search input (e.g., by typing, barcode or QR code scanning, object recognition).

As noted above, the data provided by the remote server 210*a* may include store layout information for individual stores, product availability, inventory, promotions and/or coupons. In one or more implementations, the electronic device 102 may use this information to provide search suggestions for a product and/or promotion based on the device location within the store relative to the store layout information.

For example, if the electronic device 102 is near the shoe section of the store (e.g., based on the device location from the positioning circuitry 308 compared to the provided store layout), search suggestions related to shoes may be prioritized when the user initiates a search. Alternatively or in addition, if the electronic device 102 were in a different part of the store and the user input the term "shoes" within the search interface, the store layout information may be used to direct the user to the shoe section. For example, a "direct me to shoes" search suggestion may be provided in the list of search results, which can provide in-store navigation instructions for directing the user to the shoe section.

The at least one of the query completion suggestion or the search result may be displayed in association with the search (610). In displaying the search results, the electronic device 102 may categorize the search results as described above. In a case where the search suggestions from the processes corresponding to FIGS. 4-5 are also obtained, search suggestions may be grouped under a similar heading (e.g., "store A" heading). In a case where competitive search suggestions are obtained (e.g., from App B store), these search suggestions can be grouped under a separate heading (e.g., "store B" heading) and/or may be merged into the suggestions corresponding to "store A."

In a case where the user selects one of the query completion suggestion(s) and/or search result(s) as provided via the intermediary server 206, the user may be directed to a page (e.g., an interne webpage, or a page (and/or user interface) within the respective store application) with more information for the selected item. Thus, the user may access a specific page of the store, but the store is not made aware of the device location or query information that directed the user to the page. In one or more implementations, user interaction with respect to an item (e.g., a physical action such as entering the store or scanning a coupon, and/or user interaction with the device such as an online purchase or endorsement of the item) may result in the associated store being required to pay a commission for the user interaction, for example, based on a predefined agreement between the store and a search service implementing the subject system.

Figure 7:
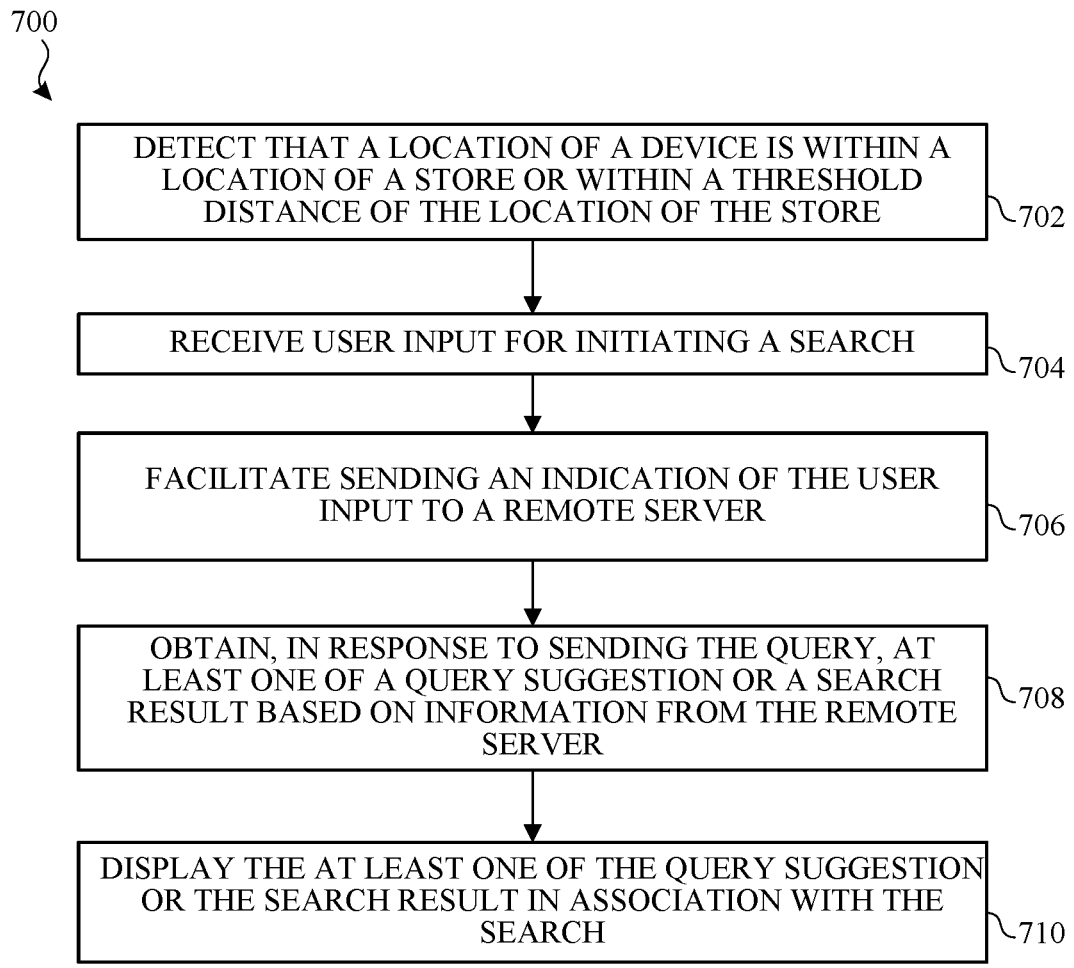
FIG. 7 illustrates a flow diagram of another example process for performing a search based on device location in accordance with one or more implementations.

FIG. 7 illustrates a flow diagram of another example process for performing a search based on device location in accordance with one or more implementations. For explanatory purposes, the process 700 is primarily described herein with reference to the electronic device 102 of FIGS. 1-3, and the remote server 210*a* of FIG. 2. However, the process 700 is not limited to the electronic device 102, and one or more blocks (or operations) of the process 700 may be performed by one or more other components of the electronic device 102. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As noted above with reference to FIGS. 4-5, the electronic device 102 one or more store applications may be installed on the electronic device 102. For example, the electronic device 102 may install Store A App corresponding to retail store chain A, and Store B App corresponding to a competing retail store chain B. For example, retail store chain A and retail store chain B may be competitors.

In the example of FIG. 7, the electronic device 102 may implement an authorization system in which the user can authorize which stores (e.g., retail store chains) can receive user data such as device location and/or user input search queries. Based on this user data, the remote server corresponding to the store (e.g., the remote server 210a) may receive information from and/or provide information to the electronic device 102. The information can be used in providing search suggestions. For example, the information can include, but is not limited to, store layout information for individual stores, product availability, inventory, promotions and/or coupons.

In one or more implementations, the authorization system can be configured via a user settings interface for each of the respective store applications and/or via operating system settings of the electronic device 102. Alternatively or in addition, the user can be prompted, when the user enters the predesignated area of the store, as to whether the user data can be sent to a remote server (e.g., remote server 210a) corresponding to the store (e.g., retail store chain).

Thus, in FIG. 7, the electronic device 102 may detect that its location is within a location of the store or within a threshold distance of the location of the store (702). As discussed above, the electronic device 102 may make this detection based on, for example, geo-fencing of individual stores and detecting device location via the positioning circuitry 308.

The electronic device 102 may receive user input for initiating a search (704), for example, a system-wide search. Using the subject system, results for the system-wide search may be expanded to include query completion suggestion(s) and/or search result(s) derived from the information received from the remote server 210a. These query completion suggestion(s) and/or search result(s) may supplement other search suggestions as described above. In one or more implementations, the remote server-based suggestion(s) and/or search result(s) may be obtained in conjunction with the search suggestions described above with reference to FIGS. 4-6.

Thus, the electronic device 102 facilitates sending an indication of the user input to the remote server 210a (706). In one or more implementations, the electronic device 102 may send an indication of the user input to the intermediary server 206. The intermediary server may remove any identifying information of the electronic device 102 (e.g., device identifier information, user identifier information) from the indication of user input, and then pass the user input (e.g., query information) to the remote server 210a. In this way, the remote server 210a is not provided with user identification information, thus preserving user anonymity.

Alternatively or in addition, when the user has authorized the remote server 210a to receive user identifying information, the indication of user input may be directly transmitted from the electronic device 102 to the remote server 210a. While the remote server 210a may receive user identifying information in this case, such receipt was preauthorized by the user based on an authorization system as noted above.

To enable communication between the electronic device 102 and the remote server 210a, a store application may provide a network identifier (e.g., URL) for the remote server 210a to the electronic device 102 (e.g., upon installation of the store application and/or any time thereafter). The user may access this network identifier in order to directly communicate with the remote server 210a.

The electronic device 102 obtains, in response to the sent indication, at least one of a query completion suggestion or a search result based on the information provided by the remote server 210a (708). As discussed above, the obtained query completion suggestion(s) and/or search result(s) may adaptively and/or dynamically adjust based on user input. Thus, search suggestions upon opening the system-wide search interface may be different than the dynamically-based search suggestions obtained as the user updates his/her search input (e.g., by typing, barcode or QR code scanning, object recognition).

As noted above, the data provided by the remote server 210a may include store layout information for individual stores, product availability, inventory, promotions and/or coupons. The electronic device 102 may use this information to provide search suggestions for a product and/or promotion based on the device location within the store, for example, relative to the store layout information.

By virtue of using the authorization system, it is possible for the user to obtain search suggestions without sending user data information to all of the remote servers 210a-210n. Instead, since the user preauthorizes which stores (e.g., retail chain stores) may receive user data upon entering a geo-fenced store, the number of remote servers which are authorized to receive the user data is controlled to the remote servers authorized by the user.

In the example of FIG. 7, it is possible for the intermediary server 206 to calculate and maintain global knowledge across multiple users, as noted above with respect to FIG. 6. Rankings for search suggestions can be updated accordingly.

The at least one of the query completion suggestion or the search result may be displayed in association with the search (710). In displaying the search results, the electronic device 102 may categorize the search results as described above. In a case where the search suggestions from the processes corresponding to FIGS. 4-6 are also obtained, search suggestions may be grouped under a similar heading (e.g., "store A" heading). In a case where competitive search suggestions are obtained (e.g., from App B store), these search suggestions may be grouped under a separate heading (e.g., "store B" heading).

In a case where the user selects one of the query completion suggestion(s) and/or search result(s) as provided by the remote server 210a, the user may be directed to a page (e.g., an internet webpage, or a page (and/or user interface) within the respective store application) with more information for the selected item. Thus, the user may access a specific page of the store, but device location and/or query information is directed to remote servers on a limited, and user-preauthorized, basis. In one or more implementations, user interaction with respect to an item (e.g., a physical action such as entering the store or scanning a coupon, and/or user interaction with the device such as an online purchase or endorsement of the item) may result in the associated store being required to pay a commission for the user interaction, for example, based on a predefined agreement between the store and a search service implementing the subject system.

While FIGS. 4-8 are illustrated and described as separate processes, the subject system may provide search suggestions to the user based on one or more combinations of these processes. For example, the store layout information described with respect to FIGS. 6-7 may be used in conjunction with the keywords described with respect to FIG. 5. Thus, the location of the electronic device 102 relative to the store layout may be used in weighting and/or prioritizing certain keywords. For example, if the electronic device 102 is within a threshold distance of an item based on the store layout and device location, corresponding keywords can be surfaced. In one or more implementations, in addition to store layout information and/or device location, proximity to certain items within a store can be determined by other manners (e.g., Bluetooth beacons tagged to certain items, NFC tags on items, time/angle of arrival determinations, etc.), and search suggestions may ranked and surfaced accordingly.

In another example, the search suggestions for competitors (e.g., as provided by the processes of FIGS. 5-8) may be used to supplement the intranet-based suggestions described with respect to FIG. 4, so that information from competing stores may still be presented to the user while connected to a local store's intranet. Of course, other combinations of the processes described in FIGS. 4-8 may be used to in providing search suggestions.

Figure 8:
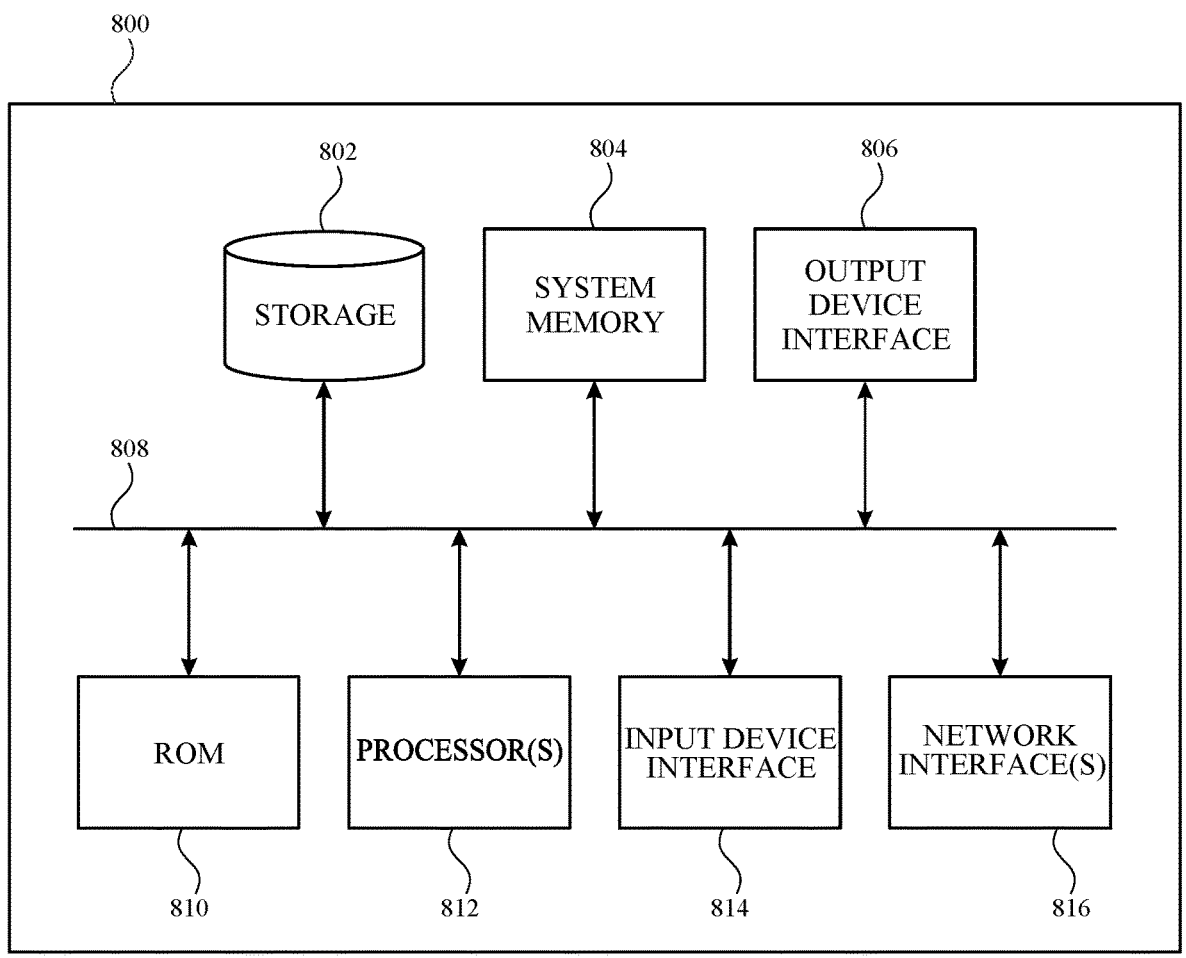
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic device 102, the intermediary server 206, the remote servers 210*a*-210*n*, and the local server 208 shown in FIG. 2. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 102 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A computer program product comprising code stored in a tangible computer-readable storage medium, the code comprising:
  code to detect, by a device, that a location of the device is within a location of a store or within a threshold distance of the location of the store;
  code to establish, responsive to the detection, a connection between the device and an intermediary server associated with the store, wherein the intermediary server pre-stores information provided by a remote server associated with the store to the intermediary server;
  code to receive user input for initiating a search;
  code to obtain, in response to the received user input, at least one of a query completion suggestion or a search result, wherein the at least one of the query completion suggestion or the search result is obtained from the information pre-stored at the intermediary server; and
  code to display the at least one of the query completion suggestion or the search result in association with the search.

2. The computer program product of claim 1, wherein the pre-stored information comprises store layout information and the at least one of a query completion suggestion or a search result is prioritized based on the location of the device relative to the store layout information.

3. The computer program product of claim 1, wherein the search corresponds to a system-wide search for items stored locally on the device, and wherein the code to display further comprises code to display at least one additional query completion suggestion or the search result corresponding to the items locally on the device.

4. The computer program product of claim 1, wherein detecting that the location of the device is within the location of the store or within the threshold distance of the location of the store is based on a geo-fenced location of the store.

5. The computer program product of claim 1, wherein the intermediary server is configured to transfer device data between the device and the intermediary server and prevent the device data from being provided to the remote server.

6. The computer program product of claim 1, wherein the device does not have an application associated with the store installed on the device.

7. The computer program product of claim 1, wherein the intermediary server pre-stores the information prior to receipt of the user input for initiating the search.

8. A device, comprising:
  at least one processor configured; and
  a memory including instructions that, when executed by the at least one processor, cause the at least one processor to:
    detect, by the device, that a location of the device is within a location of a store or within a threshold distance of the location of the store;
    responsive to the detecting, establish a connection between the device and an intermediary server associated with the store, wherein the intermediary server pre-stores information provided by a remote server associated with the store to the intermediary server:
    receive user input for initiating a search;
    obtain, in response to the received user input, at least one of a query completion suggestion or a search result, wherein the at least one of the query completion suggestion or the search result is obtained from the information pre-stored at the intermediary server; and
    display the at least one of the query completion suggestion or the search result in association with the search.

9. The device of claim 8, wherein the pre-stored information comprises store layout information and the at least one of a query completion suggestion or a search result is prioritized based on the location of the device relative to the store layout information.

10. The device of claim 8, wherein the search corresponds to a system-wide search for items stored locally on the device, and wherein the at least one processor is configured to display at least one of the query completion suggestion or the search result in association with the search by displaying at least one additional query completion suggestion or the search result corresponding to the items locally on the device.

11. The device of claim 8, wherein the at least one processor is configured to detect that the location of the device is within the location of the store or within the threshold distance of the location of the store based on a geo-fenced location of the store.

12. The device of claim 8, wherein the intermediary server is configured to transfer device data between the device and the intermediary server and prevent the device data from being provided to the remote server.

13. The device of claim 8, wherein the device does not have an application associated with the store installed on the device.

14. The device of claim 8, wherein the the intermediary server pre-stores the information prior to receipt of the user input for initiating the search.

15. A method, comprising:
  detecting, by a device, that a location of the device is within a location of a store or within a threshold distance of the location of the store;
  responsive to the detecting, establishing a connection between the device and an intermediary server associated with the store, wherein the intermediary server pre-stores information provided by a remote server associated with the store to the intermediary server;
  receiving user input for initiating a search;
  obtaining, in response to the received user input, at least one of a query completion suggestion or a search result, wherein the at least one of the query completion suggestion or the search result is obtained from the information pre-stored at the intermediary server; and
  displaying the at least one of the query completion suggestion or the search result in association with the search.

16. The method of claim 15, wherein the pre-stored information comprises store layout information and the at least one of a query completion suggestion or a search result is prioritized based on the location of the device relative to the store layout information.

17. The method of claim 15, wherein the search corresponds to a system-wide search for items stored locally on the device, and wherein the displaying of the at least one of the query completion suggestion or the search result in association with the search comprises displaying at least one additional query completion suggestion or the search result corresponding to the items locally on the device.

18. The method of claim 15, wherein the intermediary server is configured to transfer device data between the device and the intermediary server and prevent the device data from being provided to the remote server.

19. The method of claim 15, wherein the device does not have an application associated with the store installed on the device.

20. The method of claim 15, wherein the intermediary server pre-stores the information prior to receipt of the user input for initiating the search.

21. The method of claim 15, wherein obtaining the at least one of the query completion suggestion or the search result from the intermediary server comprises obtaining the at least one of the query completion suggestion or the search result from the intermediary server while preventing the location of the device from being provided to the remote server.

* * * * *

UNITED STATES PATENT AND TRADEMARK OFFICE
CERTIFICATE OF CORRECTION

| | | |
|---|---|---|
| PATENT NO. | : 11,977,593 B2 | Page 1 of 1 |
| APPLICATION NO. | : 17/348698 | |
| DATED | : May 7, 2024 | |
| INVENTOR(S) | : Anubhav Malhotra et al. | |

It is certified that error appears in the above-identified patent and that said Letters Patent is hereby corrected as shown below:

In the Claims

Column 21, Line 63 (Claim 8):
Please replace: "intermediary server: receive" with: --intermediary server; receive--.

Column 22, Line 33 (Claim 14):
Please replace: "wherein the the intermediary" with: --wherein the intermediary--.

Signed and Sealed this
Thirteenth Day of August, 2024

*Katherine Kelly Vidal*

Katherine Kelly Vidal
*Director of the United States Patent and Trademark Office*